United States Patent [19]

Yoshida

[11] Patent Number: 5,012,076

[45] Date of Patent: Apr. 30, 1991

[54] TRANSACTION METHOD WHEREIN TRANSACTION AMOUNT IS COMPARED WITH ACCOUNT BALANCE BEFORE ID IS ENTERED

[75] Inventor: Yasuhisa Yoshida, Owariasahi, Japan

[73] Assignee: Hitachi, Ltd., Tokyo, Japan

[21] Appl. No.: 317,397

[22] Filed: Mar. 1, 1989

[30] Foreign Application Priority Data

Mar. 2, 1988 [JP] Japan .................................. 63-47559

[51] Int. Cl.$^5$ .............................................. G06F 15/30
[52] U.S. Cl. ..................................... 235/379; 235/380
[58] Field of Search ................................ 235/379, 380

[56] References Cited

U.S. PATENT DOCUMENTS 4,839,504  6/1989  Nakano ................................ 235/379

Primary Examiner—Stuart S. Levy
Assistant Examiner—Kenton R. Mullins
Attorney, Agent, or Firm—Pennie & Edmonds

[57] ABSTRACT

A money can be withdrawn from one's bank account with a cash data corresponding to the to-be-drawn money amount written in the storage area of a portable IC card or the like. The bank account consists of a first storage area of account balance and transaction data and a second storage area for data indicative of a money amount shifted from the first account as cash data. In case of a money deposit, a data corresponding to a money amount to be deposited is subtracted from a cash data stored in the IC card or the like, and the data corresponding to the money amount to be deposited is written into the first storage area. The data indicative of the drawn money amount stored in the above-mentioned second storage area is updated. Also, when a money is transferred from his bank account to another's account, such as for a commercial transaction, the intended transaction amount is first compared against the cash data stored in the IC card or the like. If the intended transaction amount is less than the cash data the user enters his authorization code and a data corresponding to the money amount to be transferred, or price of the commodity, is subtracted from the cash data stored in the IC card or the like and the data corresponding to the transferred money amount is written into the first storage area. At this time, the data indicative of the drawn amount stored in the second account of the transferring side is updated.

2 Claims, 8 Drawing Sheets

M1, M2 Data strage area

Fig. 7

Cash data will be as follows due
to your transaction.
When it is correct, press OK key.
If not, press CORRECT key.

Cash data before transaction : ¥ 1,215

Drawn money amount : ¥ 25,700

Cash data after transaction : ¥ 26,915

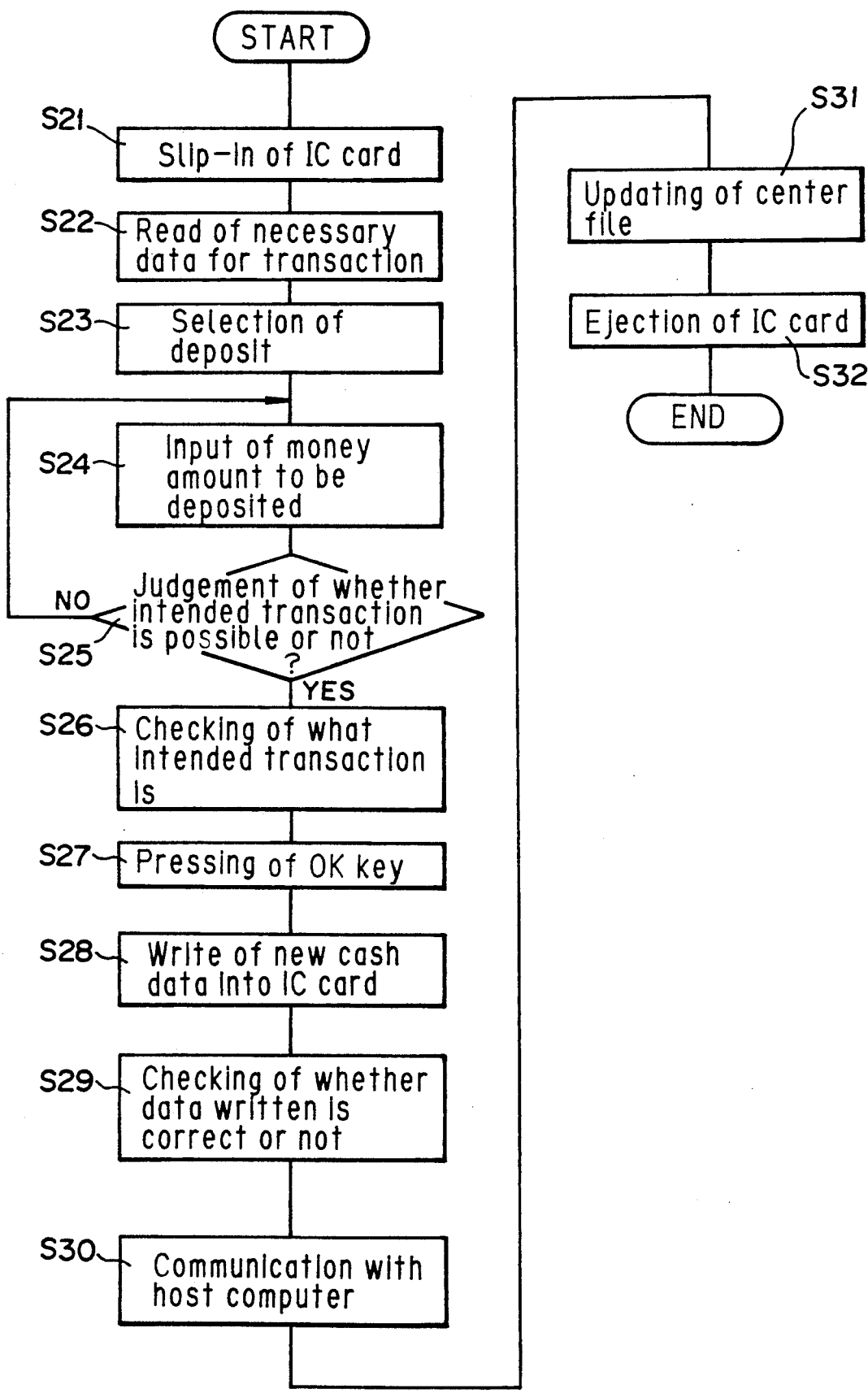

Fig. 9

Cash data will be as follows due
to your transaction.
When it is correct, press OK key.
If not, press CORRECT key.

Cash data before transaction : ¥ 10,000

Deposited money amount : ¥ 8,000

Cash data after transaction : ¥ 2,000

Fig. 11

Cash data will be as follows due
to your transaction.
When it is correct, press OK key.
If not, press CORRECT key.

Cash data before transaction : ¥ 9,000

Transfered money amount : ¥ 3,000

Charge for transfer : ¥ 600

Cash data after transaction : ¥ 5,400

TRANSACTION METHOD WHEREIN TRANSACTION AMOUNT IS COMPARED WITH ACCOUNT BALANCE BEFORE ID IS ENTERED

BACKGROUND OF THE INVENTION

(1) Field of the Invention

The present invention relates to a method for cashless transaction, cashless transaction system and cashless transaction apparatus, and more particularly to a method for cashless transaction, cashless transaction system and a cashless transaction apparatus which permits a user to make a transaction with a bank such as withdrawal of a money from his account, deposition of a money into his account or, transfer of a money from said user's account to another's account at the same bank or another bank, without using any cash, and which also permits one to make a general commercial transaction or trading without using any cash.

(2) Description of the Related Art

In the conventional transaction with a bank, cash are used when one draws a money from his account, deposits money in his account or transfers a money from his account to any other's account at the same bank or another bank. Therefore, the conventional automatic teller machines and automatic transfer machines must incorporate a cash handling feature and no transaction can be made with a bank without using cash.

Also in the general commercial transaction or business deal, one must use cash in paying for a purchased commodity or service except for use of a credit card. Indeed, use of a credit card enables one to make a commercial transaction without using any cash. Using a credit card, one can pay money for the purchased commodity or service independently of his balance at the bank, but he is likely to draw a money exceeding his balance at the bank, that is, he may possibly make a so-called "overdraw".

As one of the prior arts related with the present invention, an invention has been proposed as disclosed in the Japanese Unexamined Patent Publication No. Sho 62-75765. According to the method disclosed in the Publication, the balance at the bank can be recorded in one's IC card, but cash is to be used when drawing money from his account at the bank.

SUMMARY OF THE INVENTION

The present invention has an object to provide a transaction system which allows a bank transaction or general commercial transaction without using cash.

According to another object of the present invention, a method and apparatus for bank transaction are provided which permit one to make a transaction with his bank such as withdrawing money from his account, depositing money into his account or transferring money from his account to any other's account at the same bank or another bank without using any cash.

According to still another object to the present invention, an automatic transaction apparatus is provided which is to be installed at each bank and which has no cash handling feature.

According to yet another object of the present invention, a method and apparatus are provided which permit one to make a business deal without using any and to avoid any "overdraw" from his bank account.

According to still yet another object of the present invention, a shop's terminal unit is provided which is intended for use in a general commercial transaction and which has no cash handling feature.

According to the present invention, a money can be drawn by one from his account at a bank with a data corresponding to the to-be-drawn money amount written in the storage area of a portable IC card or the like. The data corresponding to the above-mentioned money to be drawn is referred to as "cash data" hereinafter. The bank account consists of a first storage area containing transaction data such as deposit money amount, drawn money amount, transferred money amount, etc. and a second area containing data indicative of a money amount drawn from the first storage area. In case of a money deposit, a data corresponding to a money amount to be deposited is subtracted from a cash data stored in the IC card or the like, and the data corresponding to the money amount to be deposited is written into the first storage area. At this time, the data indicative of the drawn money amount stored in the above-mentioned second storage area is updated. This updating is done by subtracting the data indicative of the above-mentioned to-be-deposited money amount from the data indicating the drawn amount before the transaction for the money deposition and storing the result of the subtraction as a data indicating the new drawn amount into the second storage area. Also, when a money is transferred from his account at the bank to another's account at the same bank or another bank, a data corresponding to the money amount to be transferred is subtracted from the cash data stored in the IC card or the like and the data corresponding to the transferred money amount is written into the first storage area. At this time, the data indicative of the drawn amount stored in the second account of the transferring side is updated. This updating is done by subtracting the data indicating the above-mentioned transferred money amount from the data indicating the drawn amount before the transaction for the transfer and storing the result of the subtraction as a data indicating the new drawn amount into the second storage area. When one makes a commercial transaction with a shop or the like, a data corresponding to the price of a commodity or service he has to pay is subtracted from the cash data stored in the IC card or the like, the data corresponding to the price is transmitted to the host computer of the bank and the data corresponding to the price of the commodity or service is subtracted from the data indicating the drawn money amount stored in the second storage area.

These and other objects and advantages will be better understood from the ensuing description made, by way of example, of the preferred embodiments with reference to the drawings.

BRIEF DESCRIPTION OF THE DRAWINGS

FIG. 7 is an explanatory drawing showing an example of a user's guidance shown on the display of the automatic transaction apparatus when a transaction for money withdrawal is done;

FIG. 8 is a flow chart schematically showing the transaction for money deposition using the automatic transaction apparatus;

FIG. 9 is an explanatory drawing showing an example of a user's guidance shown on the display of the automatic transaction apparatus when a transaction for money deposition is done;

FIG. 11 is an explanatory drawing showing an example of a user's guidance shown on the display of the automatic transaction apparatus when a transaction for money transfer is done;

FIG. 12 is a block diagram showing the construction of a shop's terminal unit which is installed at a shop or the like.

DETAILED DESCRIPTION OF THE PREFERRED EMBODIMENTS

Figure 1:
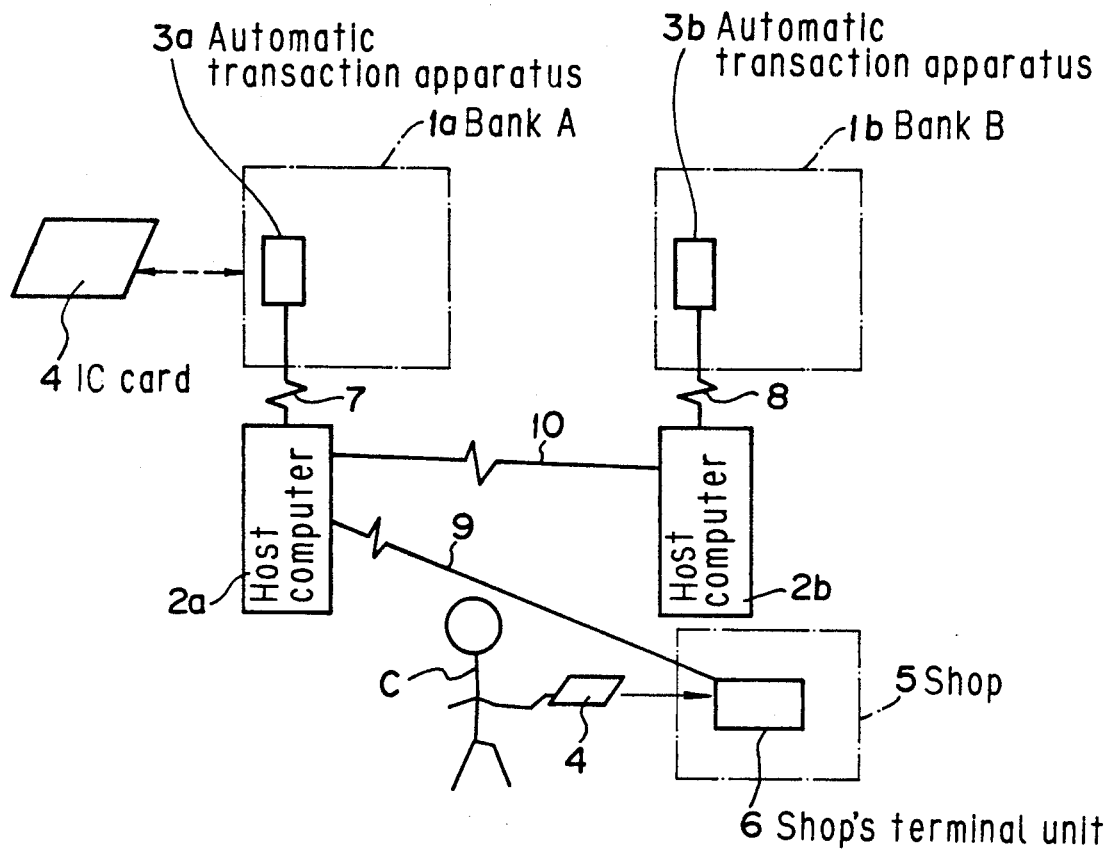
FIG. 1 is an explanatory drawing schematically showing the method for cashless transaction according to the present invention.

FIG. 1 is a schematic explanatory drawing of a transaction made according to the present invention. As in FIG. 1, when one makes a transaction for money withdrawal from his account at a branch office 1a of a bank A, a data corresponding to a money amount to be drawn (this data will be referred to as "cash data" hereinafter) is written into the storage area of an IC card 4. The data in the storage area in the above-mentioned IC card 4 is processed by an automatic transaction apparatus 3a installed at the branch office 1a of the bank A and a host computer 2a of the bank A. Therefore, no cash is used in the above-mentioned money-withdrawing transaction. The host computer 2a is installed in the head office of the bank A and linked to the automatic transaction apparatus 3a by means of a communication network 7. When a user C having the IC card 4 buys a commodity at a shop 5, the payment is made with a data corresponding to the price of the commodity subtracted from the cash data stored in the storage area in the IC card 4. The data in the IC card 4 for this commercial transaction is processed by the shop's terminal unit 6 installed in the shop 5 and the host computer 2a of the bank A. The shop's terminal unit 6 is linked to the host computer 2a of the bank A by means of a communication network 9, and the data corresponding to the price of the commodity the user C has bought is processed for settlement with his account stored in the storage area of the host computer 2a. After this data processing, a money amount corresponding to the commodity price is transferred from the account of the user C at the branch office 1a of the bank A to the account of the shop 5 at a branch office 1b of a bank B. This transfer transaction is done between the host computer 2a of the bank A and that at the bank B by means of a communication network 10.

Also, the host computer 2a of the bank A is linked to a variety of terminal units (including the automatic transaction apparatus) installed at many branch offices of the bank A by means of the communication networks. This is also true for the host computer 2b of the bank B. In this example, the automatic transaction apparatus 3b installed at the branch office 1b of the bank B and the host computer 2b of the bank B are linked to each other by means of a communication network 8. Therefore, a transaction using the IC card can be similarly done using the automatic transaction apparatus installed at each branch office.

As mentioned above, the present invention permits one to use no cashes in making a money withdrawing transaction with a bank. The non-requirement of cash is not limited to the money withdrawal, but also applies to other transactions such as money deposit or transfer between accounts. Also when one shops or enjoys a service at a shop or any like facility, he can pay a money for the transaction without using any cash.

Figure 2:
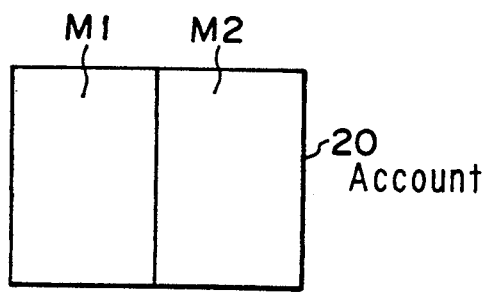
FIG. 2 is an explanatory drawing showing the account opened by one with a bank.

Next, a transaction made between a user and bank will be explained in detail. FIG. 2 is an explanatory drawing showing a sample bank account used in the method for transaction according to the present invention. As in FIG. 2, an account 20 has two data storage areas M1 and M2. The first data storage area M1 is for storage of the remainder of deposit or balance at the bank, drawn money amount, etc. and so it is equal to the data storage area of the convention account. The second data storage area M2 is for storage of a cash data (corresponding to a drawn money amount using the IC card) recorded in a cash data storage section 22 in the IC card shown in FIG. 3. This second data storage area M2 is provided according to the present invention. These data storage areas M1 and M2 are provided, for each account, in the storage area called "center file" in the host computer of the bank. Note that since the money amount recorded in the data storage area M2 is regarded as already drawn, it may not yield any interest.

Figure 3:
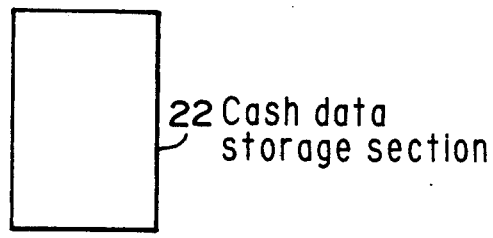
FIG. 3 is an explanatory drawing showing a cash data storage section formed on the IC card.

FIG. 3 is an explanatory drawing showing an example of the cash data storage section 22 provided in the storage area in the IC card 4 used according to the present invention. The cash data is stored into the cash data storage section 22 in the IC card 4 by the automatic transaction apparatus 3a of the bank A.

Figure 4:
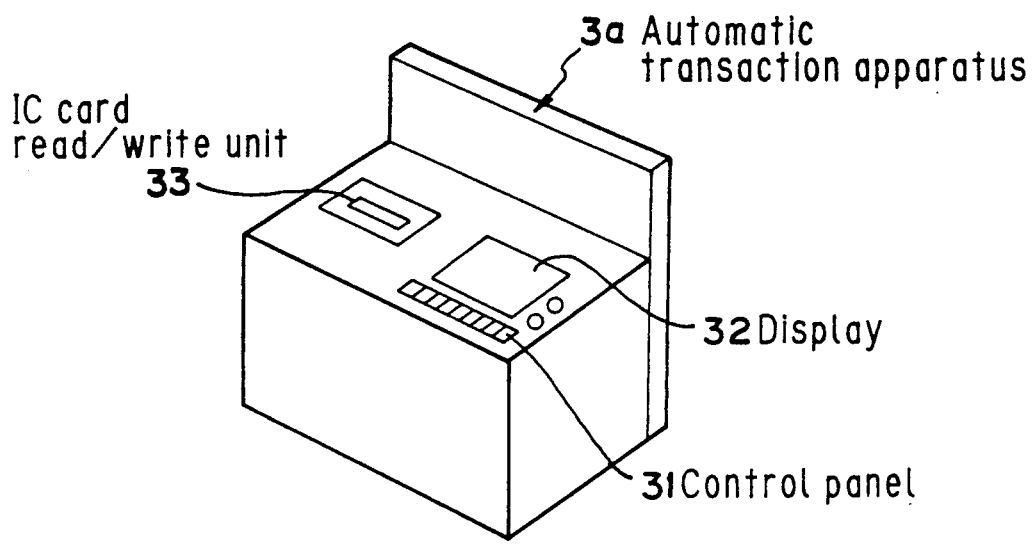
FIG. 4 is a perspective view showing the external view of an example automatic transaction apparatus installed in a bank.

FIG. 4 is a perspective view showing the outline of the automatic transaction apparatus 3a shown in FIG. 1.

As shown in FIG. 4, the automatic transaction apparatus 3a comprises a control panel 31 to be operated for input of a secret identification number, a money amount to be drawn, etc., a display 32 to show a user's guidance, etc., and an IC card read/write unit 33 for reading/write a data stored in the IC card 4. This automatic transaction apparatus 3a is so designed as to automatically make a transaction for deposit drawal, for money deposition or transfer as the control panel 31 is operated by a user.

Figure 5:
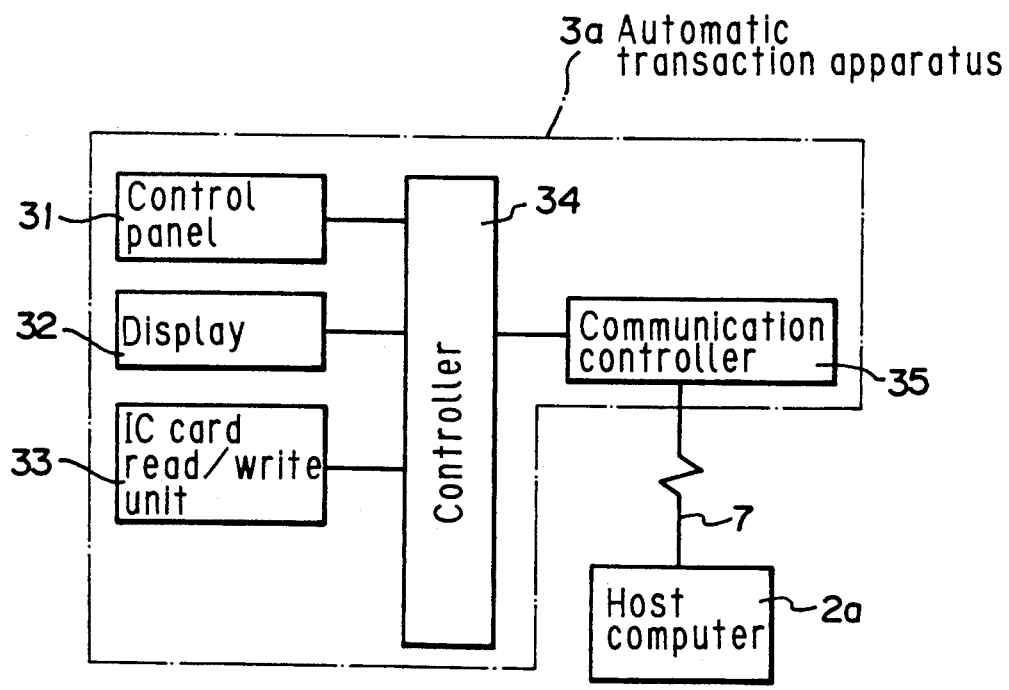
FIG. 5 is a block diagram showing the internal construction of the automatic transaction apparatus shown in FIG. 4.

FIG. 5 is a block diagram showing the internal construction of the automatic transaction apparatus 3a shown in FIG. 4. The same elements as in FIG. 4 and assigned the same reference numerals as in FIG. 4 will be further explained. In FIG. 4, the automatic transaction apparatus 3a comprises a controller 34 incorporating a micro processor (not shown) and which controls the entire automatic transaction apparatus 3a. A communication control 35 is provided for controlling the data transmission/reception made between the host computer 2a and automatic transaction apparatus 3a by means of the communication network 7. The host computer 2a has a center file in which the account 20 is stored, a communication control which controls the data transmission/reception made by means of the communication network 7, and the like. Also the host computer 2a is linked top the terminal unit installed at each of the branch offices by means of the communication network 7.

Next, a transaction for deposit withdrawal using the automatic transaction apparatus 3a will be described with reference to the flow chart shown in FIG. 6. As in FIG. 6, as the user C slips his IC card into the IC card read/write unit 33 (at step S1), the IC card read/write unit 33 reads his account number, necessary data for new transaction, such as cash data, etc. stored in the cash data storage section 22 from the storage area in the IC card 4 (at step S2). Next, the controller 34 judges based on the data read by the IC card read/write unit 33 whether or not the IC card slipped in the apparatus 3a is valid. If the controller 34 decides that the IC card slipped in the apparatus 3a is valid, a guidance "INPUT YOUR SECRET IDENTIFICATION NUMBER" is shown on the display 32 (at step S3). Then the user operates the control panel 31 to supply his own secret identification number (at step S4). The controller 34 transmits his secret identification number supplied from the control panel 31, account number read from the IC card 4, etc. to the host computer 2a via the communication control 35 and communication network 7. Receiving thus his account number read from the IC card 4 and his secret identification number supplied from the control panel 31, the host computer 2a judges whether or not the secret identification number previously entered for the account number is equal to the secret identification number supplied from the control panel 31 by the user himself (at step S5). When the host computer 2a decides that both the secret identification numbers are equal to each other, it sends an answer, to the controller 34 of the automatic transaction apparatus 3a via the communication network 7, indicating that the instant user is an authorized customer having an account at the bank in consideration. Receiving this answer, the controller 34 provides a guidance "INPUT AN AMOUNT TO BE DRAWN" on the display 32 (at step S6). Watching this guidance displayed, the user supplies a money amount he wants to withdraw by operating the control panel 31 (at step S7). The controller 34 transmits a data indicative of the to-be-drawn money amount supplied by the user to the host computer 2a via the communication control 35 and communication network 7. The host computer 2a compares a data indicating the balance at the bank stored in the data storage area M1 of the account 20 with the data indicative of the to-be-drawn money amount. If his to-be-drawn money amount is smaller than the balance at the bank, it is determined that his transaction for money withdrawal is possible. On the other hand, in case his to-be-drawn money amount exceeds his balance at the bank, a decision is made that his intended transaction is impossible. This decision is sent to the automatic transaction apparatus 3a via the communication network 7 (at step S8). If his intended transaction is determined to be possible, the controller 34 adds the IC card 4 cash data before the money drawing transaction and stored in the cash data storage section 22 in the IC card 4 to the data indicating his to-be-drawn money amount, and provides an indication, on the display 32, of a new cash data being the result of the addition, the cash data currently stored in the cash data storage section 22 and the to-be-drawn money amount for confirmation by the user (at step S9).

FIG. 7 shows an example of a guidance to be shown on the display 32 at the step S9. When the displayed contents of transaction are correct, the user presses the OK key on the control panel 32 (at step S10). Detecting that the OK key is pressed, the controller 34 commands the IC card read/write unit 33 to write the new cash data which in turn will store the new cash data into the cash data storage section 22 in the IC card 4 (at step S11). The controller 34 commands the IC card read/write unit 33 to read the new cash data written into the IC card 4, compares the read new cash data with the new cash data used for write and check that the new cash data has been correctly written (at step S12). When it is determined that the new cash data has been correctly written, the controller 34 sends to the host computer 2a via the communication network 7 a signal that the write is completed (at step S13). After receiving the above-mentioned signal, the host computer 2a updates the contents of the account 20 of the user in consideration (see FIG. 2). Namely, a data indicating the new balance at the bank is written into the data storage area M1. The data indicating this new balance at the bank is derived from the subtraction of the data indicative of the above-mentioned withdrawn money amount from the data indicating the balance at the bank currently stored in the data storage area M1. Also, the data indicating the money amount having been drawn using the IC card and which is stored in the data storage area M2 is updated. Namely, the data indicating the drawn money amount currently stored in the data storage area M2 and the data indicating the money amount having been drawn in the latest drawing transaction are added together and the result of this addition is stored into the data storage area M2 as a data indicative of the money amount drawn using the IC card (at step S14). Next, the IC card read/write unit 33 ejects the IC card 4, and the transaction is completed (at step S15).

Figure 6:
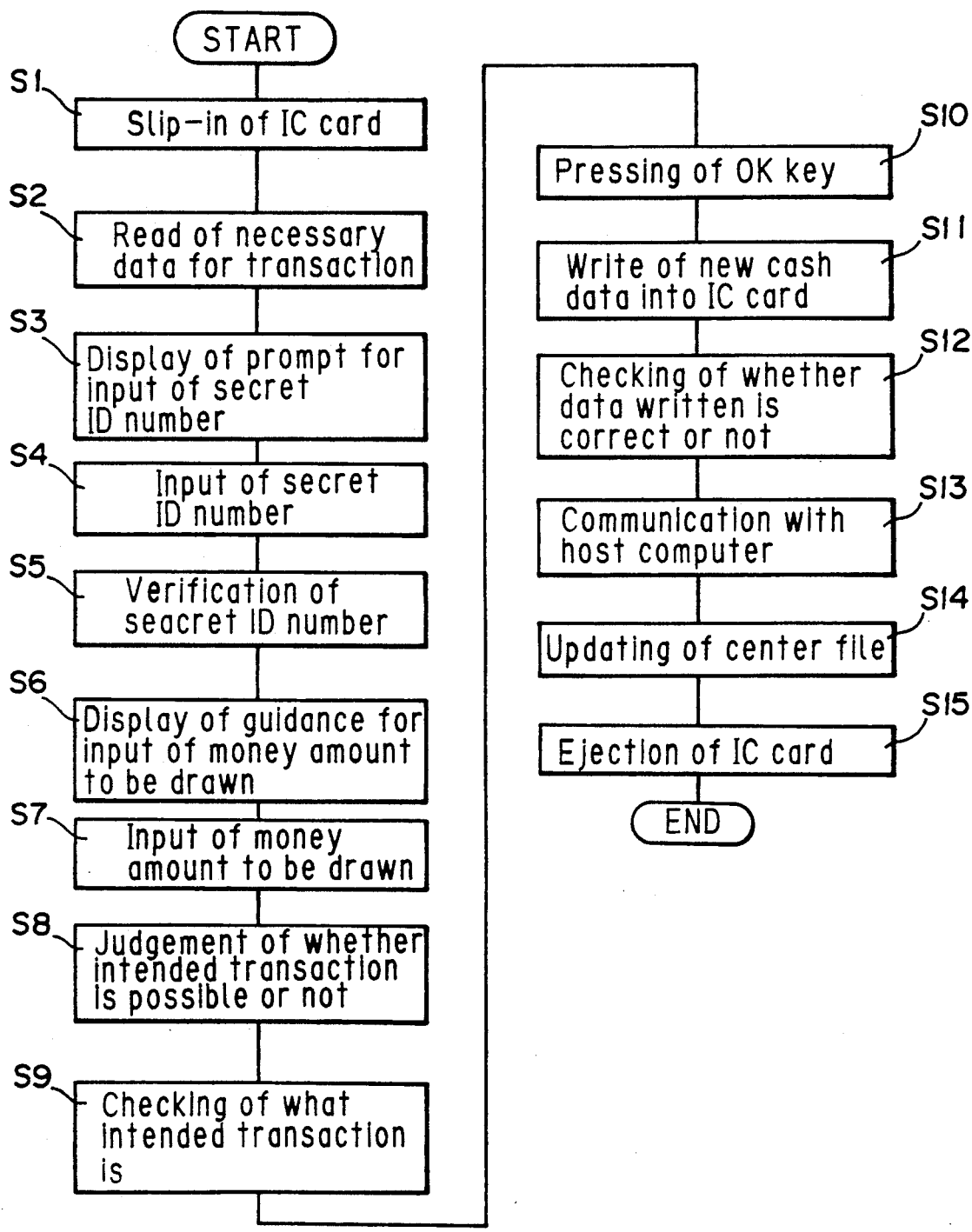
FIG. 6 is a flow chart schematically showing the transaction for money withdrawal using the automatic transaction apparatus.

In the flow chart shown in FIG. 6, a step for selection of the money withdraw transaction among various transactions may be provided between the steps S2 and S3.

Next, a transaction for money deposit using the automatic transaction apparatus 3a will be described with reference to FIG. 8. As in FIG. 8, when the user slips his IC card into the IC card read/write unit 33 (at step S21), the IC card read/write apparatus 33 reads his account number, necessary data for transaction, such as cash data, etc. stored in the cash data storage section 22 from the storage area in the IC card 4 (at step S22). Next, the controller 34 judges based on the data read by the IC card read/write unit 33 whether or not the IC card slipped in the apparatus 3a is valid. If the controller 34 decides that the IC card slipped in the apparatus 3a is valid a transaction selection menu is shown on the display 32 for selection of the transaction for money deposition by the user (at step S23). When the transaction for money deposit is selected, the controller 34 provides a display of a guidance "INPUT MONEY AMOUNT YOU ARE GOING TO DEPOSIT". The user operates the control panel to supply his intended money amount (at step S24). Next, the controller 34 compares the cash data read from the IC card 4 (data stored in the cash data storage section 22) with the input data indicating his intended money amount. If the money amount indicated with the cash data is larger than his deposit amount, the controller 34 determines that the transaction for money deposition is possible. On the other hand, if the money amount indicated by the cash data is smaller than his deposit amount, the transaction determined impossible (at S25). In case the money deposit is determined impossible, the program returns to the step S24, and the user retries another input of a money amount to be deposited. However, in this case, the money amount should be smaller than the preceding attempt. If it is determined at the step S25 that the transaction for money deposit is possible, the controller 34 subtracts a data indicating the money amount to be deposited from the above-mentioned IC card 4 cash data to obtain a new cash data. Next, the controller 34 provides a display of the cash data before the transaction, data indicating the money amount to be deposited and the new cash data for confirmation by the user (at step S26).

FIG. 9 shows an example guidance shown in the display 32 at the step S26. In case the displayed contents of transaction are correct, the user press the OK key (at step S27). Detecting that the OK key is pressed, the controller 34 commands the IC card read/write unit 33 to write the new cash data, and the IC card read/write unit 33 stores the above-mentioned new cash data into the cash data storage section 22 (at step S28). The controller 34 commands the IC card read/write unit to read the new cash data written in the IC card 4, compares the read new cash data with the new cash data used for writing, and checks that the new cash data has been correctly written (at step S29). In case the new cash data has been correctly written, the controller 34 sends to the host computer 2a via the communication network 7 a signal that the write of the cash data into the IC card read/write unit 33 has been completed, account number, data indicating the deposited money amount, etc. (at step S30). After receiving the above-mentioned various data, the host computer 2a updates the contents of the user's account 20 (see FIG. 2) stored in the center file as follows. Namely, the data indicating the new balance at the bank is written into the data storage area M1 of the account 20. The data indicating the new balance at the bank is derived from the addition of the data indicating the balance at the bank, and currently stored in the data storage area M1, and the data indicating the deposited money amount. Also the data indicating the money amount drawn using the IC card and stored in the data storage area M2 is updated. Namely, the data indicating the above-mentioned deposited money amount is subtracted from the data indicating the drawn money amount and currently stored in the data storage area M2, and the result of the subtraction is stored into the data storage area M2 as a data indicating the money amount drawn using the IC card (at step S31). Next, the IC card 4 is ejected from the IC card read/write unit 33, and here the transaction for money deposition is over (at step S32).

Figure 10:
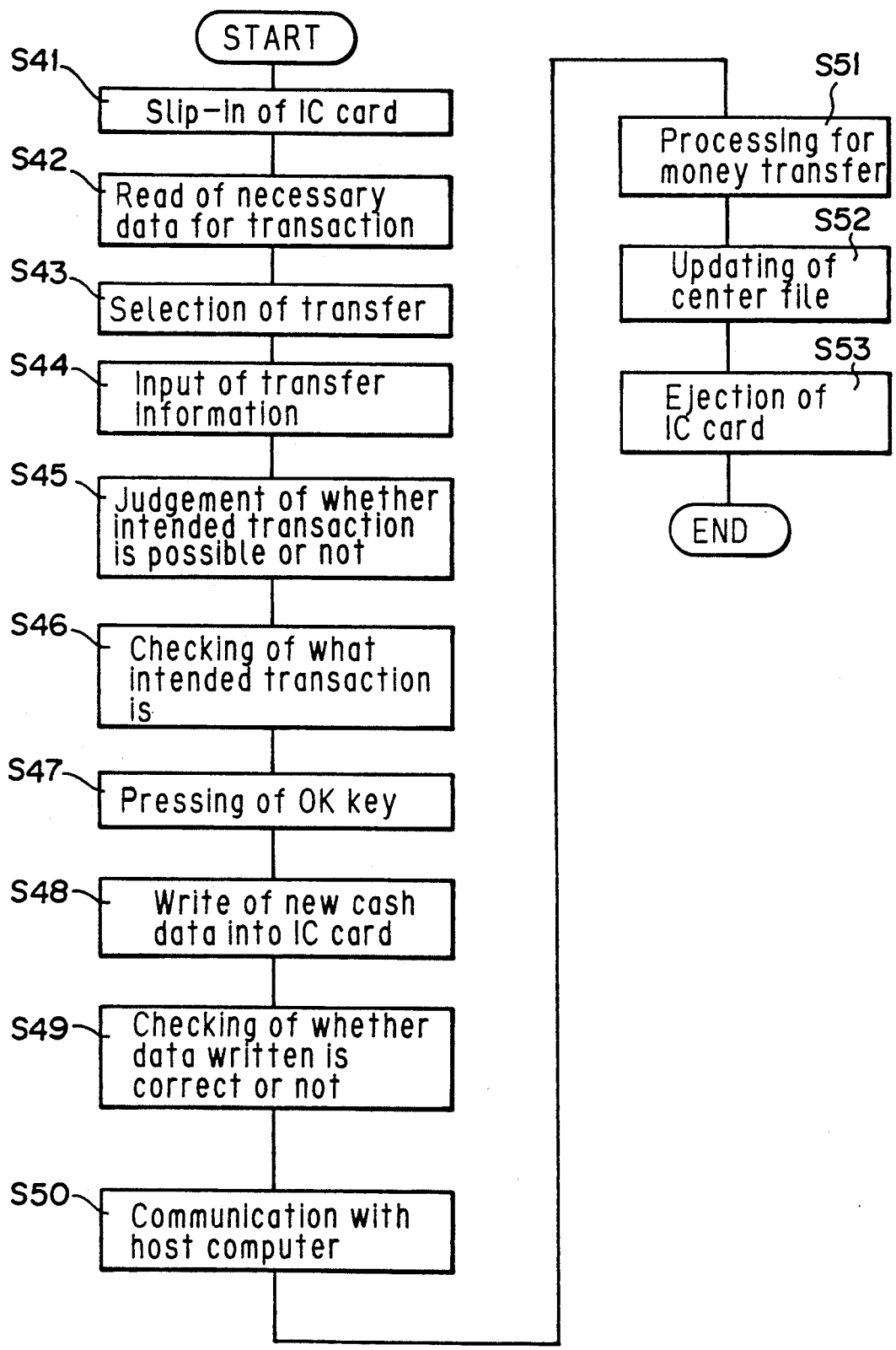
FIG. 10 is a flow chart schematically showing the transaction for money transfer using the automatic transaction apparatus.

Next, a transaction for money transfer using the automatic transaction apparatus 3a will be described with reference to the flow chart in FIG. 10. As shown in FIG. 10, when the user slips his IC card into the IC card read/write unit 33 (at step S41), the IC card read/write apparatus 33 reads his account number, necessary data for transaction, such as cash data, etc. stored in the cash data storage section 22 from the storage area in the IC card 4 (at step S42). Next, the controller 34 judges based on the data read by the IC card read/write unit 33 whether or not the IC card slipped in the apparatus 3a is valid. If the controller 34 decides that the IC card slipped in the apparatus 3a is normal, a transaction selection menu is shown on the display 32 for selection of the transaction for money transfer by the user (at step S43). When the transaction for money transfer is selected, the controller 34 provides a display of a guidance for input of transfer information on the display 32. According to the above-mentioned displayed guidance, the user operates the control panel 31 to supply necessary information for the money transfer such as name of the destination bank, destination account number at the bank, name of the person having the destination account, money amount to be transferred, etc. (at step S44). Next, the controller 34 compares the cash data read from the IC card 4 (data stored in the cash data storage section 22) with a data derived from addition of an input data indicating a money amount he intended to transfer and a data indicating the charge for that transfer. In case the money amount indicated with the data derived from the addition is larger than the money amount indicated with the cash data, the controller 34 determines that the transaction for money transfer is impossible. On the other hand, if the money amount indicated with the data derived from the addition is smaller than the money amount indicated with the cash data, the transaction for money transfer is determined possible (at step S45). Provided the money transfer is determined at step S45 to be possible, the controller 34 subtracts the data derived from the addition from the above-mentioned cash data to obtain a new cash data. Next, the controller 34 provides a display of the cash data before the transaction, data indicating the money amount to be transferred and the new cash data for confirmation by the user (at step S46).

FIG. 11 shows an example guidance shown on the display 32 at the step S46. If the displayed contents of the transaction are correct, the user presses the OK key at the control panel 31 (at step S47). Detecting that the OK key is pressed, the controller 34 commands the IC card read/write unit 33 to write the new cash data, and the IC card read/write unit 33 stores the above-mentioned new cash data into the cash data storage section 22 (at step S48). The controller 34 commands the IC card read/write unit 33 to read the new cash data written in the IC card 4, and compares the read new cash data with the new cash data used for writing to check that the new cash data has been correctly written (at step S49). In case it decides that the new cash data has been correctly written, the controller 34 sends to the host computer 2a via the communication network 7 a signal that the write of the cash data into the IC card 4 has been completed, the user's account number, necessary data for the transaction for money transfer such as data indicating the money amount to be transferred, name of destination bank, destination account number, etc. (at step S50). After receiving the above-mentioned various data, the host computer 2a proceeds to the money transfer based on the information such as the name of destination bank, destination account number, etc. (at step S51). Next, the data indicating the money amount drawn using the IC card 4 and stored in the data storage area M2 of the user's account (see FIG. 2) storaged in the center file is updated as follows. First, the data indicating the above-mentioned transferred money amount and the charge for the transfer is subtracted from the data indicative of the money amount drawn using the IC card, and the result of the subtraction is stored into the data storage area M2 as a data indicating the new money amount drawn using the IC card (at step S52). Next, the IC card 4 is ejected from the IC card read/write unit 33, and here the transaction for money transfer is complete (at step S53).

Next, a commercial transaction at a shop or the like using the shop's terminal unit 6 will be explained.

Figure 12:
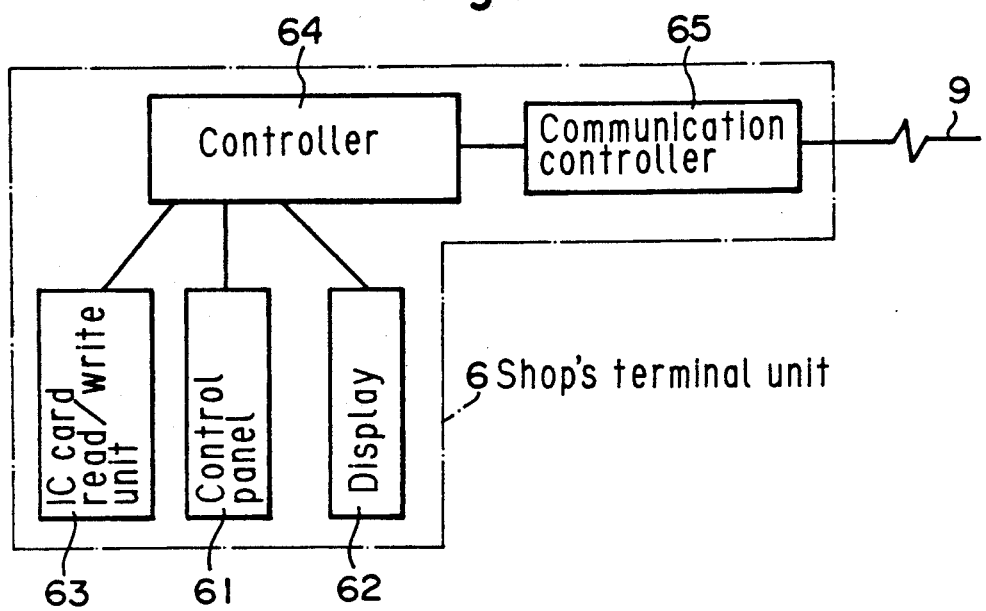

FIG. 12 is a block diagram showing the construction of the shop's terminal unit 6 shown in FIG. 1. As shown in FIG. 12, the shop's terminal unit 6 comprises a control panel 61 for input of user's secret identification number, a price of a commodity, etc., a display 62 for display of a user's guidance or the like, an IC card read/write unit 63 for reading and writing data stored in the IC card 4, a controller 64 to control the entire unit, and a communication control 65. As shown in FIG. 12, the controller 64 comprises a micro processor (not shown) and controls the entire unit. The controller 64 has a storage area in which data related to a bank account of the shop 5, such as data including, for example, name of his bank, his bank account, etc. Also the communication control 65 controls the data transmission/reception which is done between the host computer 2a and transaction unit 3A via the communication network 9.

Figure 13:
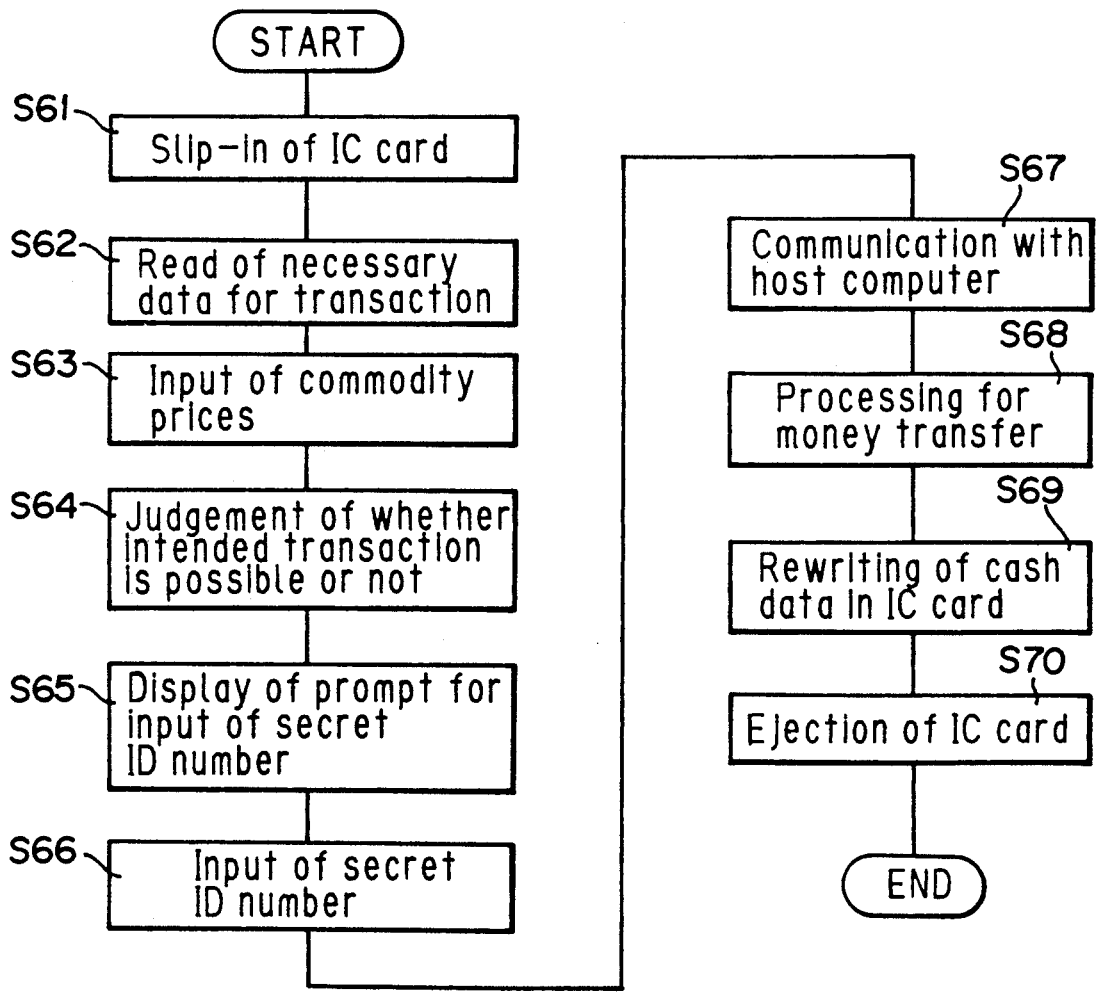
FIG. 13 is a flow chart schematically showing a commercial transaction using the shop's terminal unit.

Next, a commercial transaction using the shop's terminal unit 6 will be explained with reference to the flow chart shown in FIG. 13. As in FIG. 13, when the user C slips his IC card 4 into the IC card read/write unit 63 (at step S61), the IC card read/write unit 63 reads from the storage area in the IC card 4 necessary data such as his name, bank name, account number and cash data stored in the cash data storage section 22 for the transaction (at step S62). Next, the controller 64 judges, based on the data read by the IC card read/write unit 63, whether or not the IC card 4 slipped into the IC card read/write unit 63 is valid. The IC card 4 is determined to be valid, a user's guidance "INPUT PRICE OF COMMODITY" is shown on the display 62. Watching this guidance, the shopman supplies the price of the commodity the user has selected by operating the control panel 61 (at step S63). Next, the controller 64 compares the cash data read from the IC card 4 at the step S62 (data stored in the cash data storage section 22) with the data indicative of the input commodity price. If the commodity price is higher than the money amount indicated by the cash data, it is accordingly determined that the intended commercial transaction is impossible. If the money amount indicated with the cash data is smaller than the commodity price, the intended commercial transaction is determined to be possible (at step S64). Provided the intended commercial transaction is determined at step S64 to be possible, the controller 64 provides a user's guidance "INPUT YOUR SECRET IDENTIFICATION NUMBER" on the display 62 (at step S65). Then, the user operates the control panel 61 to supply his own secret identification number (at step S66). There is provided only one control panel 61 on the shop's terminal unit 6 as shown in the block diagram in FIG. 12. However, two control panels may be provided on the shop's terminal unit 6, for use by the shopman and by the user, respectively. When the user's own secret identification number is supplied, the controller 64 reads a data related to the shop's bank account from its own storage area and sends the 25 data concerning the read bank account and the user's secret identification number to the host computer via the communication control 65 and communication network 9 (at step S67) A destination host computer is identified based on the data (such as bank name, account number, etc.) concerning the user's account read at the step S62. The host computer verifies the secret identification number to judge whether the user is an authorized customer of the bank. This judgment is similarly done as in the processing at the step S5 in FIG. 6. If the user is determined to be an authorized customer of the bank, the host computer effects a money transfer from the user's bank account to the shop's bank account (at step S68). With this transfer, the data indicative of the balance at the bank and stored in the data storage area M1 of the shops bank account is updated. This updating of the balance at the bank is similarly done as in the updating of the data indicating the balance at the bank which is done at the step S31 in FIG. 8. After the transfer transaction is normally completed, the host computer transmits an end signal to the shop's terminal unit 6. After receiving the end signal, the shop's terminal unit 6 updates the cash data stored in the cash data storage section 22 of the IC card 4. This updating is done by subtracting the commodity price data from the current cash data and storing the result of the subtraction into the cash data storage section 22 of the IC card 4 as a new cash data (at step S69). Next, the IC card is ejected from the IC card read/write unit 63, and here the program is over.

The embodiments of the present invention have been described taking an IC card as example. However, the present invention is not limited to these embodiments, but can also be applied using a memory medium such as memory card, optical card, magnetic card, etc. Also, the shape of the memory medium is not limited to any particular card-like shape.

Also, since every commercial transaction is done within a range defined by the cash data stored in the IC card, the present invention permits to prevent any overdraw of money, which is different from the use of any credit card.

What is claimed is:

1. A method for transferring funds from a user's account using a portable storage means, comprising the steps of:

reading a first fund data stored in said portable storage means using a terminal data reading means which is connected to an automatic transaction control means, said first fund data indicating a balance of transferable fund, said transferable fund being a fund contained within an account which is available for fund withdrawal;

entering a transaction amount data into a terminal data entry means which is connected to said automatic transaction control means, said transaction amount data indicating an amount of money to be withdrawn by fund transfer from said transferable fund;

comparing said entered transaction amount data with said read first data using said automatic transfer control means;

requesting a user specific authorization code into a terminal data entry means if and only if said entered transaction amount is less than said read first data;

entering an authorization code into said terminal data entry means only if said entered transaction amount was less than said read first data;

reading data from said terminal entry means which identifies a destination bank account after said entering of said authorization code;

transferring an amount of funds from said transferable fund to said destination bank account and storing a record of said transfer, said transferring being performed by said automatic transfer control means after said entering of said authorization code; and updating said first fund data stored in said portable storage means by subtracting said transferred amount from said read first data and storing the result in said portable storage means for subsequent use.

2. The method according to claim 1 wherein said portable storage means consists of an IC card.

* * * * *